(12) United States Patent
Bennett

(10) Patent No.: US 8,113,242 B1
(45) Date of Patent: Feb. 14, 2012

(54) COMPOSITE REPAIR FOR PIPES

(75) Inventor: Barton E. Bennett, Mishawaka, IN (US)

(73) Assignee: Odyssian Technology, LLC, South Bend, IN (US)

( * ) Notice: Subject to any disclaimer, the term of this patent is extended or adjusted under 35 U.S.C. 154(b) by 93 days.

(21) Appl. No.: 12/657,316

(22) Filed: Jan. 19, 2010

(51) Int. Cl.
*F16L 55/16* (2006.01)
(52) U.S. Cl. ............... 138/99; 138/97; 156/95; 156/64
(58) Field of Classification Search .......... 138/99, 138/97; 219/228; 156/95, 64
See application file for complete search history.

(56) References Cited

U.S. PATENT DOCUMENTS

| | | | |
|---|---|---|---|
| 3,865,662 A * | 2/1975 | Segal | 156/94 |
| 4,429,213 A * | 1/1984 | Mathieu | 392/468 |
| 4,673,122 A * | 6/1987 | Dubey | 228/119 |
| 5,722,463 A * | 3/1998 | Smyth et al. | 138/170 |
| 6,237,640 B1 * | 5/2001 | Vanderlee | 138/99 |
| 6,883,835 B2 * | 4/2005 | Krout et al. | 285/15 |
| 7,066,210 B2 * | 6/2006 | Kakoschke et al. | 138/99 |
| 7,387,138 B2 * | 6/2008 | Rice et al. | 138/99 |
| 7,426,942 B2 * | 9/2008 | Rice | 138/99 |

OTHER PUBLICATIONS http://www.birkmfg.com/products/kapton_heaters.html?_cmxprint=1.
http://www.sandwichpanels.org/articles/article_thermoplasticresin.html.
http://en.wikipedia.org/wiki/Coefficient_of_thermal_expansion.
http://www.uiowa.edu/~c004020/exp10/lec/sld020.htm.
http://www.rlhudson.com/publications/techfiles/thermo.htm.

* cited by examiner

*Primary Examiner* — Patrick F Brinson

(57) ABSTRACT

A repair assembly is provided for repairing a pipe that in one embodiment includes a layer of thermoplastic material substantially surrounding the pipe in an area needing repair; a heating element located to provide heat to the layer of thermoplastic material; and an overpress at least partially surrounding the pipe and the layer of thermoplastic material. The layer of thermoplastic material may be configured as a sleeve surrounding the pipe, and the sleeve may be configured in two semicylindrical halves with longitudinal seams where the semicylindrical halves meet. The seams extend generally parallel to a longitudinal axis of the pipe, and the sleeve may further include outwardly extending flanges along the edges of the semicylindrical halves at the seams.

26 Claims, 15 Drawing Sheets

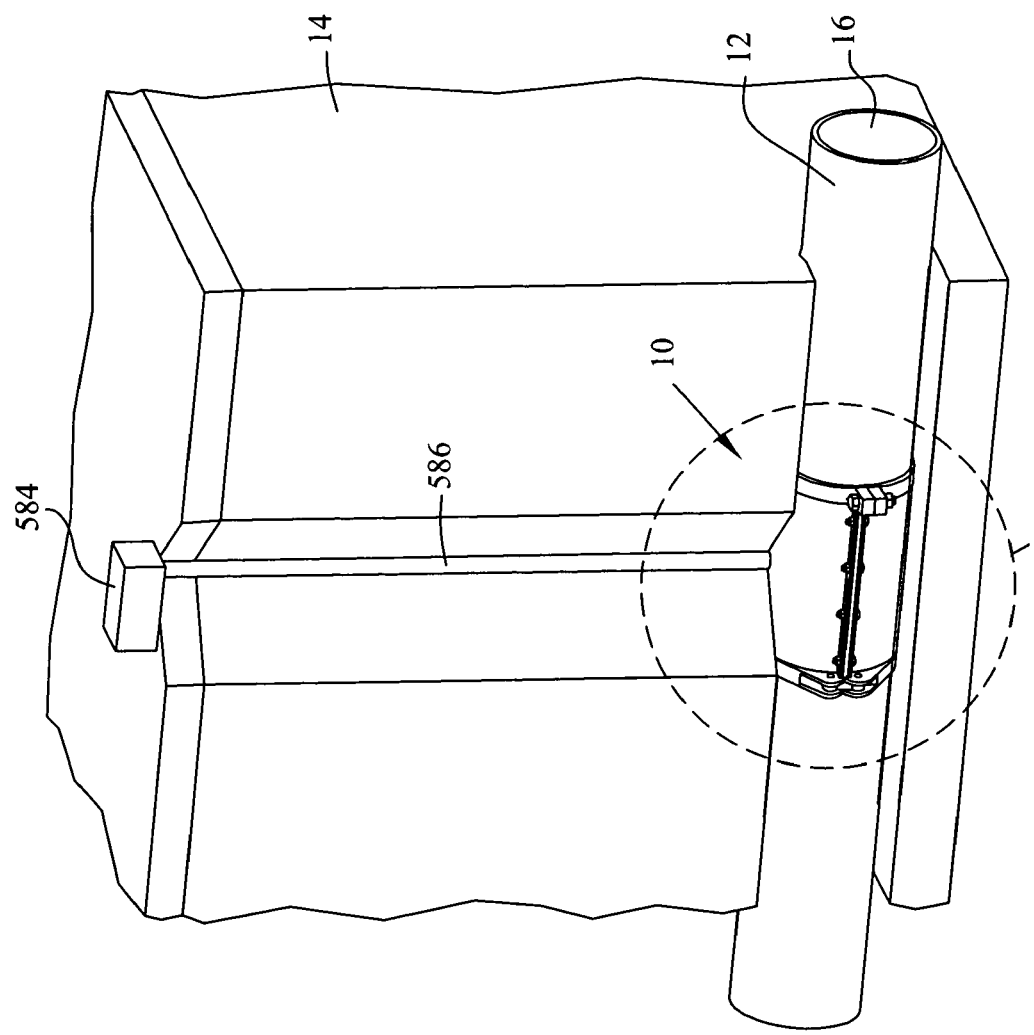

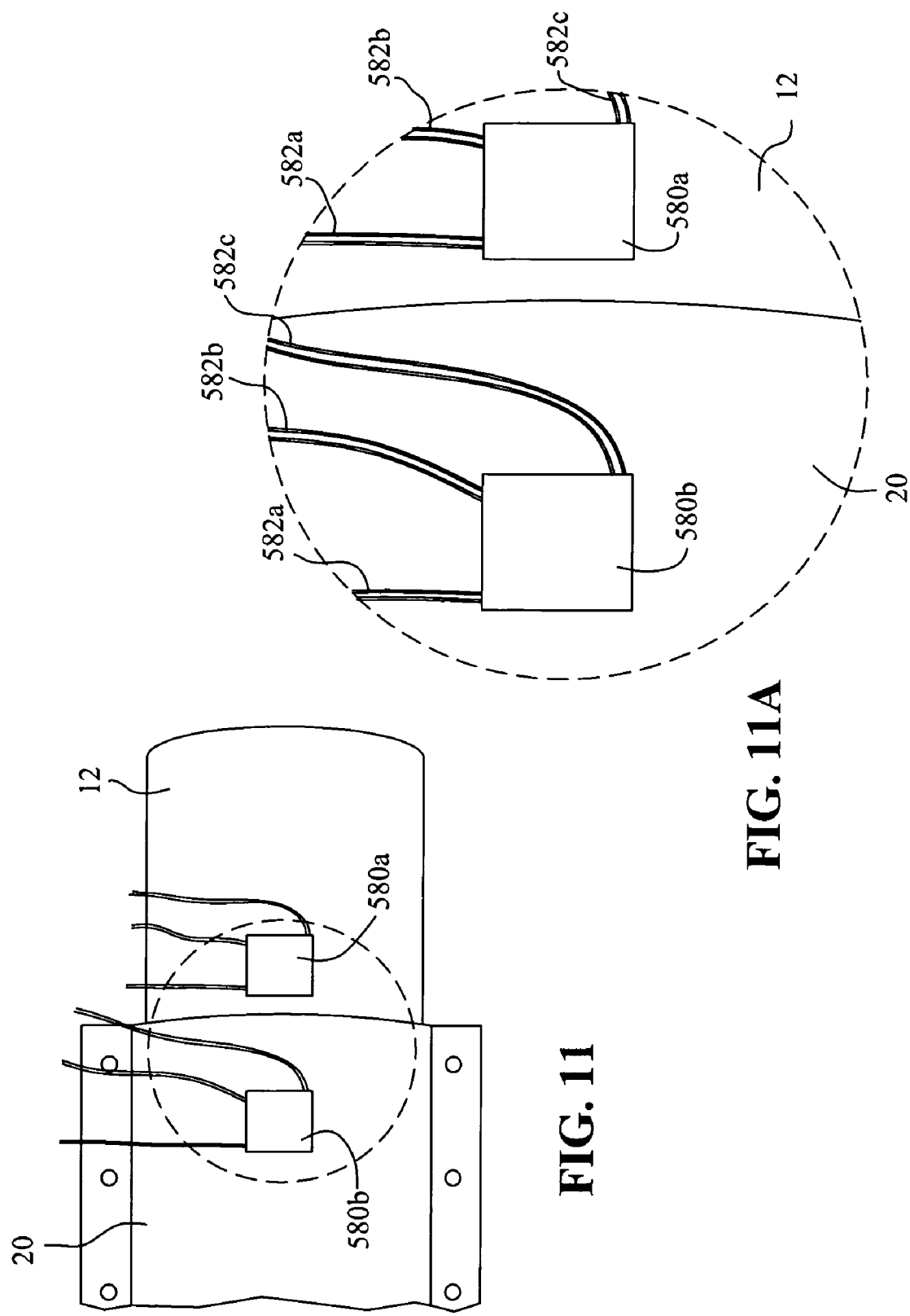

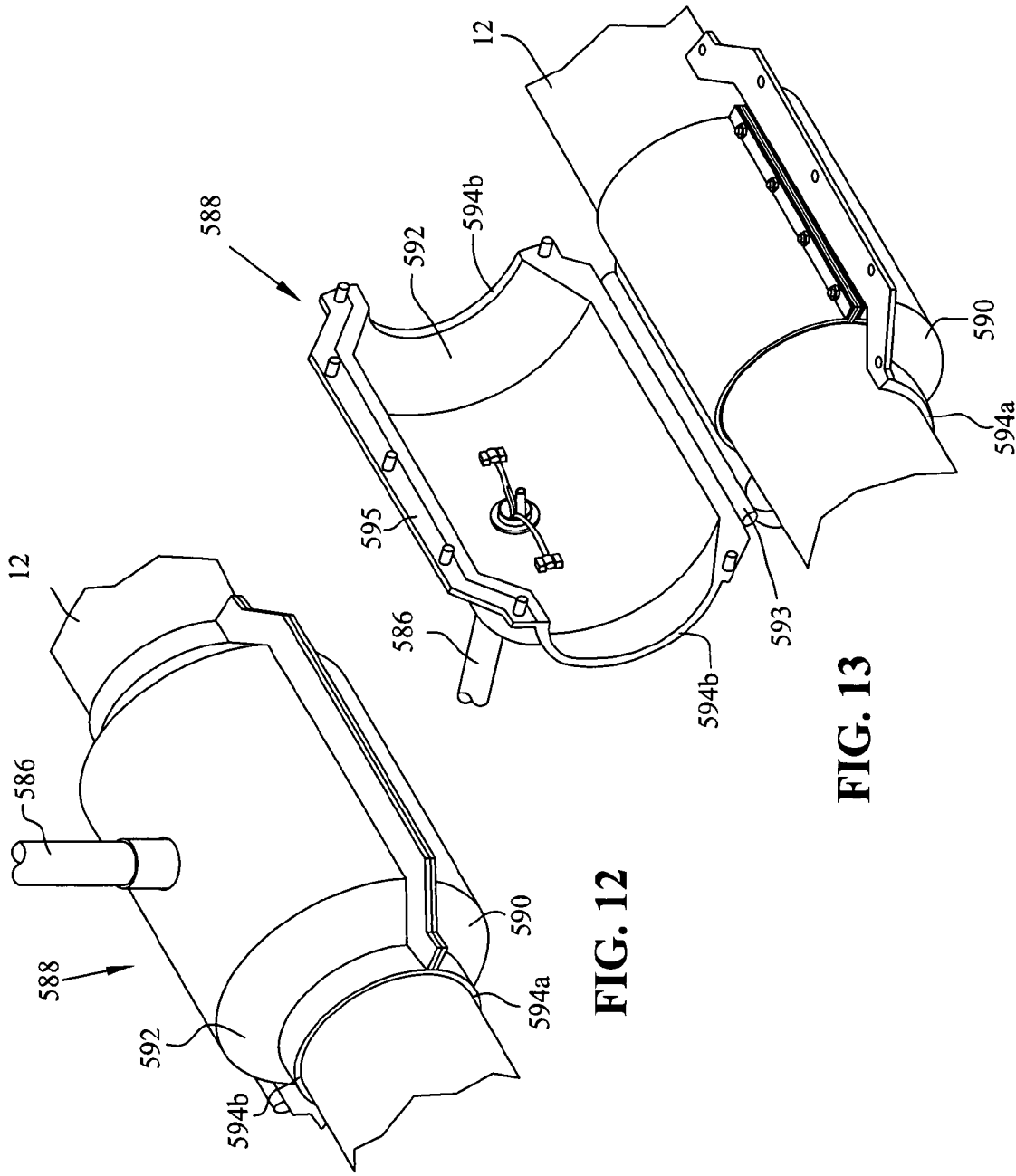

COMPOSITE REPAIR FOR PIPES

This invention was made with government support under Contract No. DTRT5708-C-10068, funded by the U.S. Department of Transportation, Pipeline and Hazardous Materials Safety Administration. The government has certain rights in the invention.

BACKGROUND OF THE INVENTION

The present invention pertains to a repair assembly and method for repairing pipes in the field, and in particular, to a repair assembly and method that includes a composite repair material that is heated in the field.

Pipes that are installed in the field or other industrial applications may be used for a multitude of purposes, such as for carrying water, sewer, gas, oil, chemicals, or other well known uses. During the course of a pipeline's use, it may become necessary to make repairs. Corrosion, cracking, ground shifting, excavation, or other accidents or environmental damage may cause the need for a localized repair in a pipe, where the majority of the pipe is still suitable for use.

One conventional way of repairing a pipe is to excavate around the pipe, cut the damaged section out, and replace it with a new section of pipe spliced into the existing pipe. This type of repair can be costly and time-consuming, as well as requiring the flow to be cut off and the pipe emptied or evacuated in order to complete the repair.

It is therefore an object of the invention to provide a repair assembly and method of repairing a pipe while the pipe remains in place in a field or other industrial location without the need to cut out and remove the damaged section. A further object of the invention is to provide a repair that will sustain the integrity of the pipe in the repaired area and to provide a method for determining if the integrity of the repair is subsequently compromised.

BRIEF SUMMARY OF THE INVENTION

In one embodiment of the invention, a repair assembly is provided for repairing a pipe including a layer of thermoplastic material substantially surrounding the pipe in an area needing repair; a heating element located to provide heat to the layer of thermoplastic material; and an overpress at least partially surrounding the pipe and the layer of thermoplastic material.

The layer of thermoplastic material may be configured as a sleeve surrounding the pipe. The sleeve of thermoplastic material may be provided in two semicylindrical halves and may have longitudinal seams where the semicylindrical halves meet extending generally parallel to a longitudinal axis of the pipe, and may further include outwardly extending flanges along the edges of the semicylindrical halves at the seams.

The repair assembly may further include a sealing member extending parallel to the longitudinal axis of the pipe and located along the seams of the thermoplastic material.

The overpress may also be configured into semicylindrical halves, and each half may include outwardly extending flanges along side edges thereof.

The repair assembly may also include a plurality of reinforcement members extending generally parallel to the axis of the pipe.

The repair assembly may be assembled around the pipe in a sandwich configuration formed along the flanges of the thermoplastic material and overpress, and wherein inner layers of the sandwich structure may include opposing flanges of the thermoplastic material, middle layers of the sandwich structure include opposing flanges of the overpress, and outside layers may be formed by the reinforcing members.

The heating element may be embedded in the layer of thermoplastic material, or may be located between the pipe and the layer of thermoplastic material. The layer of thermoplastic material may alternately or also be located between a heating element and the pipe.

The repair assembly may also include a layer of material having a significantly higher coefficient of thermal expansion thin the thermoplastic material or the overpress. The layer of material may have a higher coefficient of thermal expansion and can be located between the overpress and the layer of thermoplastic material.

The repair may further include a second layer of thermoplastic material substantially surrounding the pipe in the area needing repair, both layers of thermoplastic material being provided in semicylindrical halves with longitudinally extending seams where the halves of each layer abut, and the longitudinally extending seams of the second layer rotationally offset from the seams of the first layer. The seams of the second layer may be rotationally offset at least 45° from the seams of the first layer.

In another embodiment of the invention, a repair assembly for repairing a pipe is provided that includes a layer of thermoplastic material extending substantially around the pipe in an area needing repair; a heating element; an overpress at least partially surrounding the pipe; and a pair of strain gauges, one strain gauge located in contact with the pipe and the other strain gauge located in contact with the layer of thermoplastic material.

The repair assembly may further include a microprocessor electrically connected to the strain gauges to compare the relative strain in order to evaluate the integrity of the repair. The repair assembly may further include a sensor boot, providing an environmental seal about the repair and the strain gauges, and the sensor boot may include a hinged opening.

The repair assembly may further include an electrical conduit extending from the sensor boot to the microprocessor. The microprocessor may be located above the surface of the ground, and the pipe is located underground.

The repair assembly may further include a layer of material having a significantly higher coefficient of thermal expansion than the thermoplastic material or the overpress, and the layer of material having a higher coefficient of thermal expansion being located between the overpress and the layer of thermoplastic material.

The thermoplastic material may include longitudinally extending seams extending generally parallel to an axis of the pipe, and may further include a sealing member extending along the seams on an inside surface of the thermoplastic material.

The repair assembly may also include a second layer of thermoplastic material substantially surrounding the pipe in the area needing repair, with both layers of thermoplastic material being provided in semicylindrical halves with longitudinally extending seams where the halves abut, and the longitudinally extending seams of the second layer are rotationally offset from the seams of the first layer.

In another embodiment of the invention, a method for repairing a pipe is provided, wherein the pipe may be installed in a field application, the method includes the steps of identifying an area in the pipe requiring repair and providing access around the area; providing a repair assembly including a layer of thermoplastic material substantially surrounding the pipe in the area needing repair, a heating element, and an overpress at least partially surrounding the pipe and the layer of thermoplastic material; installing the repair assembly around the area in the pipe requiring repair; and activating the heating element to cause the thermoplastic material to flow around and seal the area in the pipe, the thermoplastic material being outwardly restrained by the overpress.

The method for repairing a pipe may further include the steps of providing a layer of material having a significantly higher coefficient of thermal expansion than the layer of thermoplastic material or the overpress, and providing the layer of material having a higher coefficient of thermal expansion between the overpress and the layer of thermoplastic material.

The layer of thermoplastic material may be provided in two semicylindrical halves, and each half may include outwardly extending flanges extending along longitudinally extending side edges thereof. The overpress may also be provided in two semicylindrical halves, and each half may include outwardly extending flanges along longitudinally extending side edges. The method for repairing a pipe may further include the steps of providing reinforcement members and fasteners and fastening the reinforcement members together with the flanges of the thermoplastic material and the overpress using the fasteners.

The method for repairing a pipe may include the step of providing a second layer of thermoplastic material substantially surrounding the first layer, each of the layers being provided in substantially a semicylindrical configuration having longitudinally extending seams along the edges of each semicylindrical section, and rotationally offsetting the seams of the second layer at least 45° from the seams of the first layer.

The method may further include the steps of providing at least two strain gauges, attaching one of the strain gauges in contact with the pipe, attaching the second strain gauge in contact with the thermoplastic material, and monitoring the strain in the two gauges to evaluate the integrity of the repair.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 1 is a perspective view of one embodiment of a repair assembly of the present invention as installed on a pipe at a site in the field;

FIG. 11 is a plan view of a repair made in accordance with the subject invention and further including strain gauge sensors;

FIG. 11A is an enlarged view in the area indicated in FIG. 11 with strain gauge sensors;

FIG. 12 is a perspective view of a sensor boot covering the strain gauge sensors of FIG. 11, sealing and providing a secondary containment structure having leak detection sensors in the space between the pipe repair and boot walls;

FIG. 13 is a perspective view of the composite repair assembly and sensor boot of FIG. 12 with the boot in an open position;

Figure 1A:
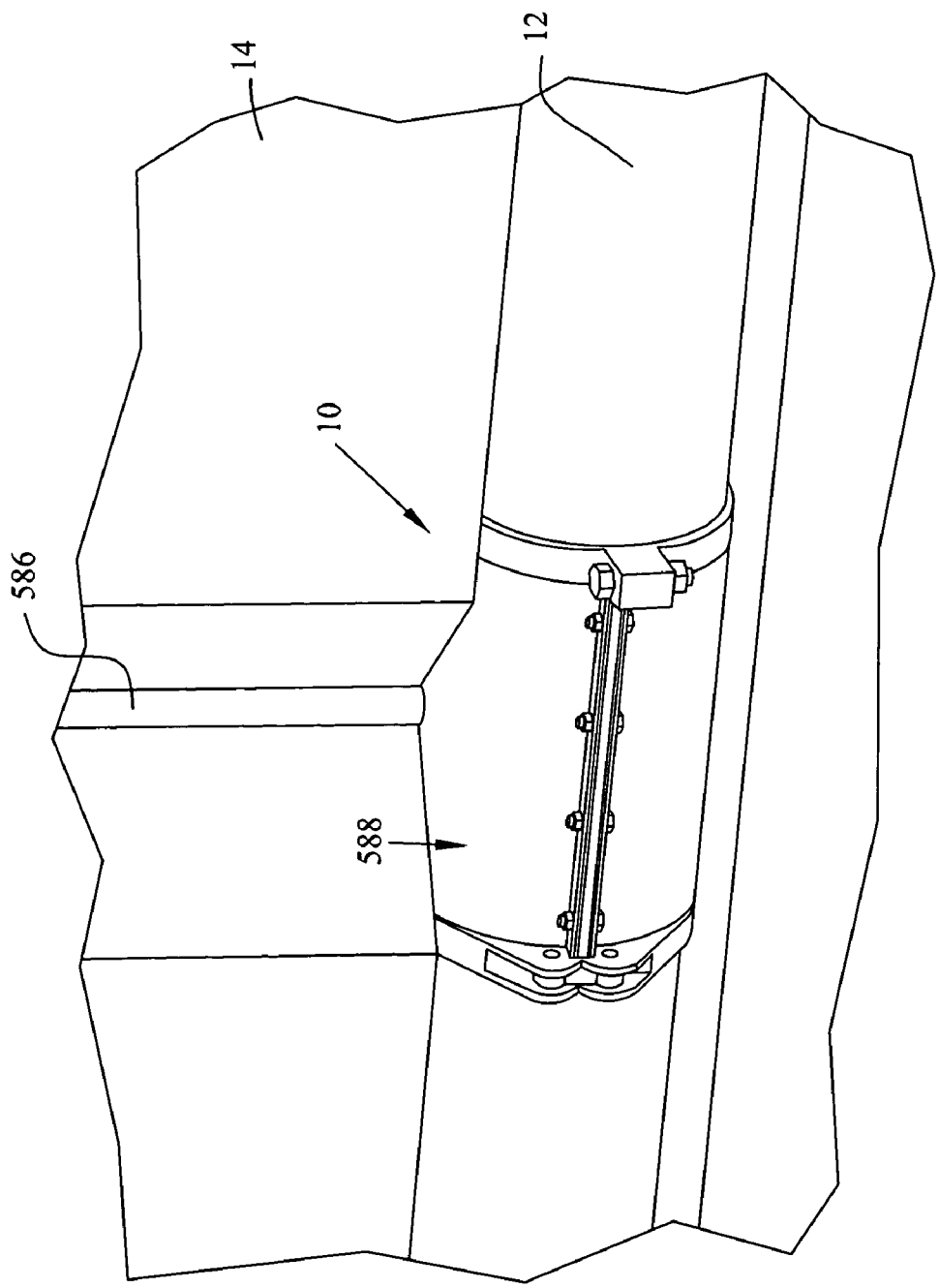
FIG. 1A is an enlarged view of the area indicated in FIG. 1.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Now referring to FIGS. 1 and 1A, a composite repair assembly, generally indicated as 10, is shown for a field installation repair. Composite repair assembly 10 is installed on a pipe or pipeline 12, which is mounted in or under the ground 14. Pipe 12 includes an internal passageway 16 through which a material (not shown) to be transported through pipe 12 is contained. Composite repair assembly 10 may be used to prepare a localized defect or damaged area 18 of pipe 12 (see FIG. 3). Pipe 12 may be manufactured from most known and commercially available pipe materials including steel or other metals, or plastic pipe, such as high-density polyethylene.

Figure 2:
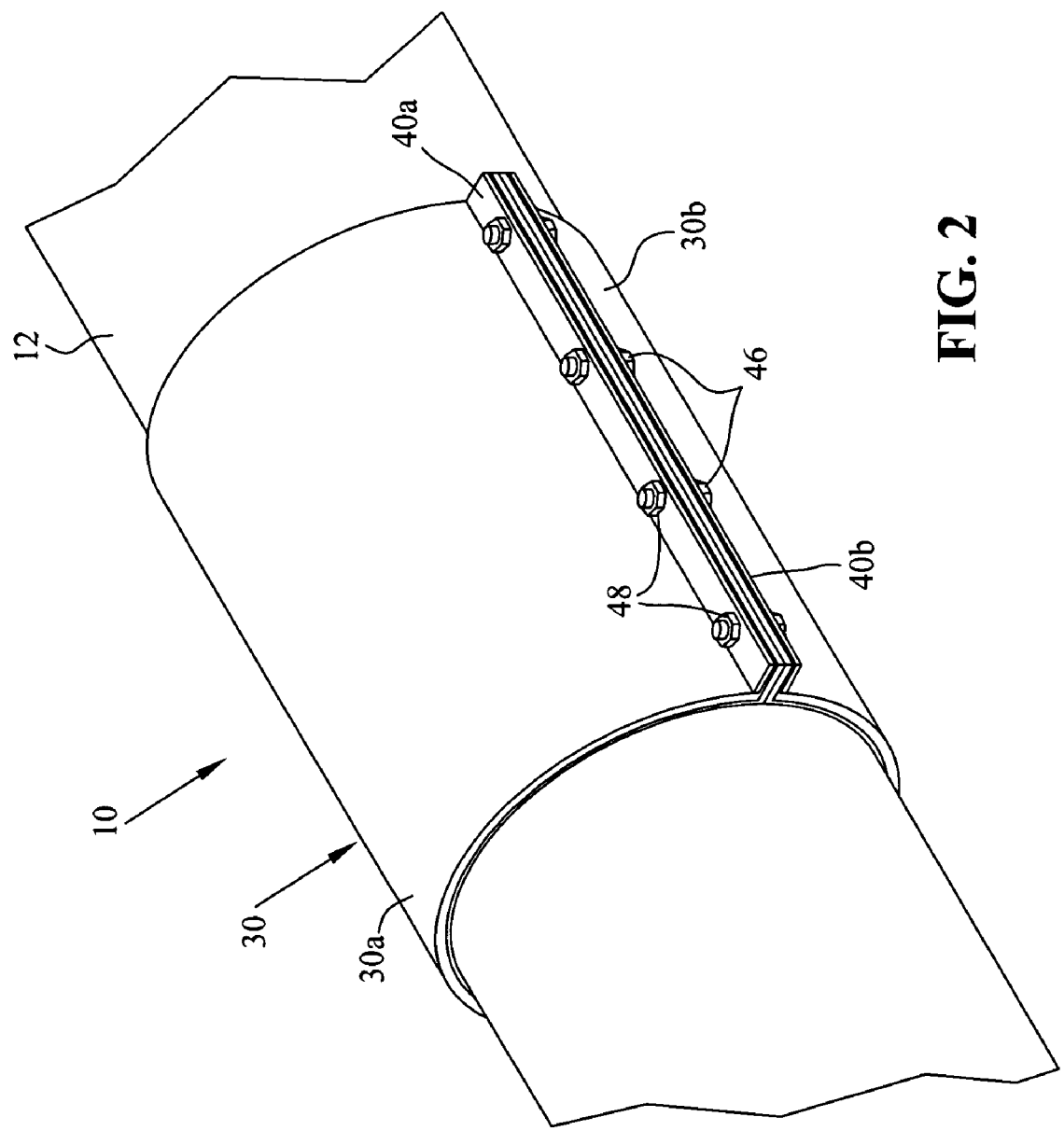
FIG. 2 is a perspective view of the repair assembly removed from the ground.
Figure 3:
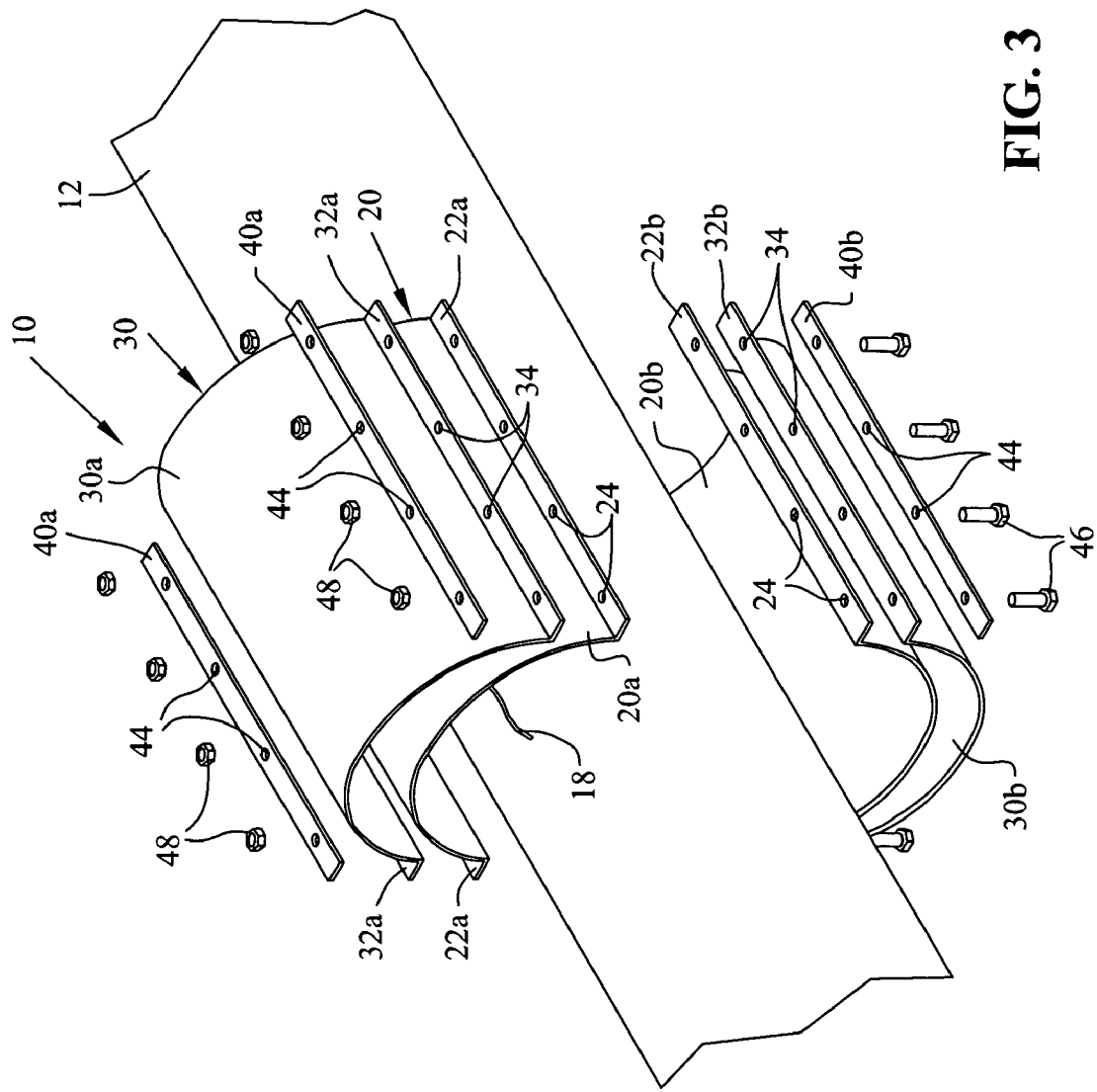
FIG. 3 is an exploded perspective view of the repair assembly of FIG. 2.
Figure 4:
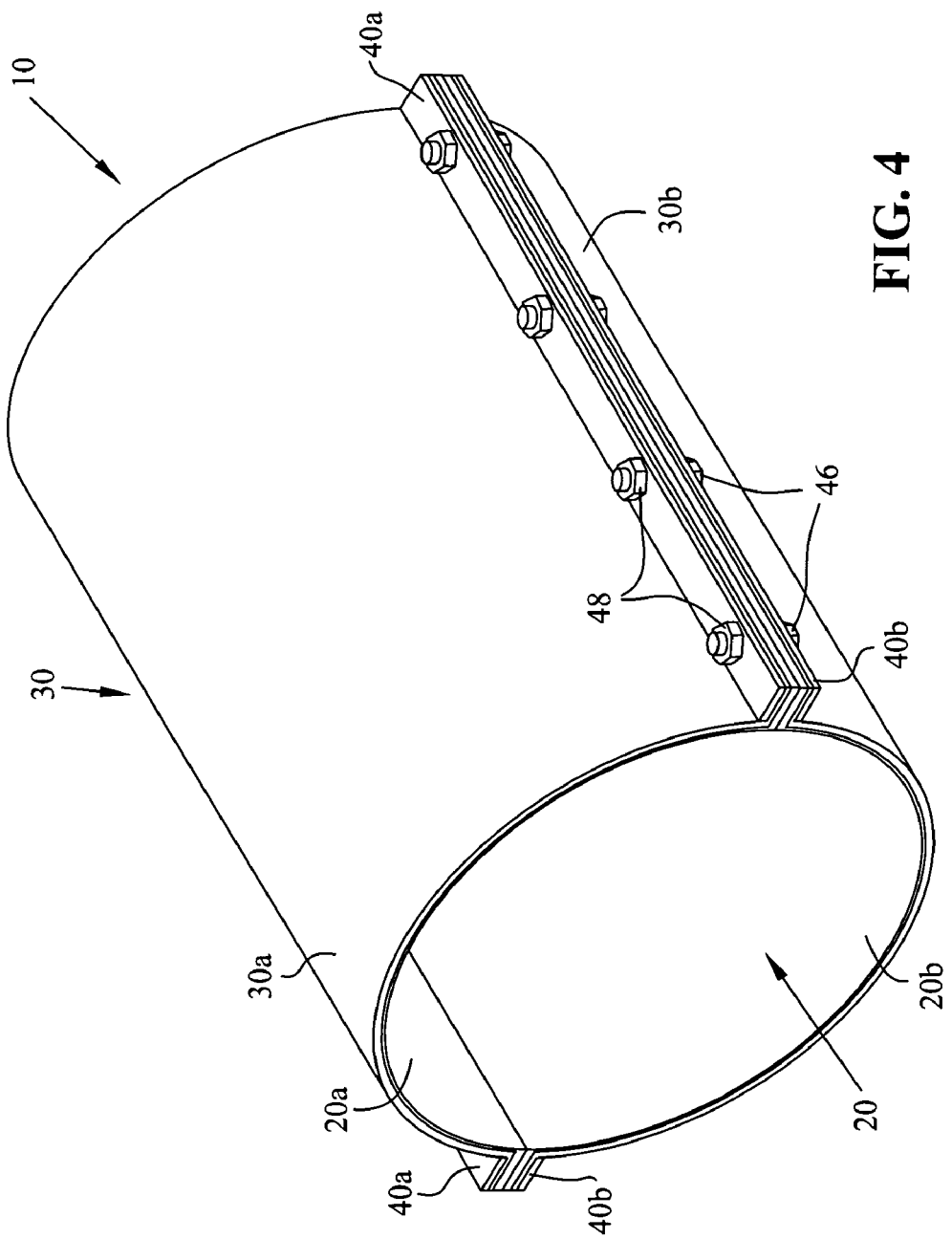
FIG. 4 is a perspective view of the repair assembly of FIG. 2 removed from the pipe.

Now referring to FIGS. 2-4, in this embodiment, composite repair assembly 10 includes a layer of thermoplastic material, generally indicated as 20, and includes two semicylindrical halves of thermoplastic material 20a and 20b, as best shown in FIG. 3. Outwardly extending flanges 22a and 22b are provided along longitudinally extending respective side edges of halves 20a and 20b. Flanges 20a and 20b include a number of holes 24 for receipt of fasteners. As used herein, the term "thermoplastic" is meant to refer to a polymer that turns to a malleable state or viscous liquid when heated and hardens when it is cooled; however, the thermoplastic does not cure or set as would a thermoset material. In other words, no cross-links are formed as with a thermoset material so that the changes in the thermoplastic are purely physical and not chemical. Accordingly, with the reapplication of heat, the thermoplastic again becomes fluid or malleable. Suitable thermoplastic materials include, but are not limited to, polymethylmethacrylate, polycarbonate, polystyrene, or polyamide.

Composite repair assembly 10 also includes an overpress, generally indicated as 30, which in this embodiment includes two semicylindrical halves 30a and 30b. As with the layer of thermoplastic material 20, overpress 30 also includes outwardly extending flanges 32a and 32b along respective longitudinally extending side edges of halves 30a and 30b. Flanges 32a and 32b include holes 34 for receipt of fasteners. Overpress 30 may be manufactured from a light gauge aluminum or other metal that is designed primarily to provide compression to the thermoplastic layer of material 20, as opposed to providing the structural strength for the repair of pipe 12.

Composite repair assembly 10 also includes reinforcement members 40a and 40b having holes 44, as well as bolts or fasteners 46 and nuts 48. It should be appreciated that reinforcement members 40a and 40b should be sufficiently strong to hold flanges 22a, 22b and 32a, 32b together without significant bending or distortion upon heating and cooling. In addition, it should be appreciated that reinforcement members 40a and 40b may take on other suitable configurations including, but not limited to, washers or other intermittent members.

Figure 5:
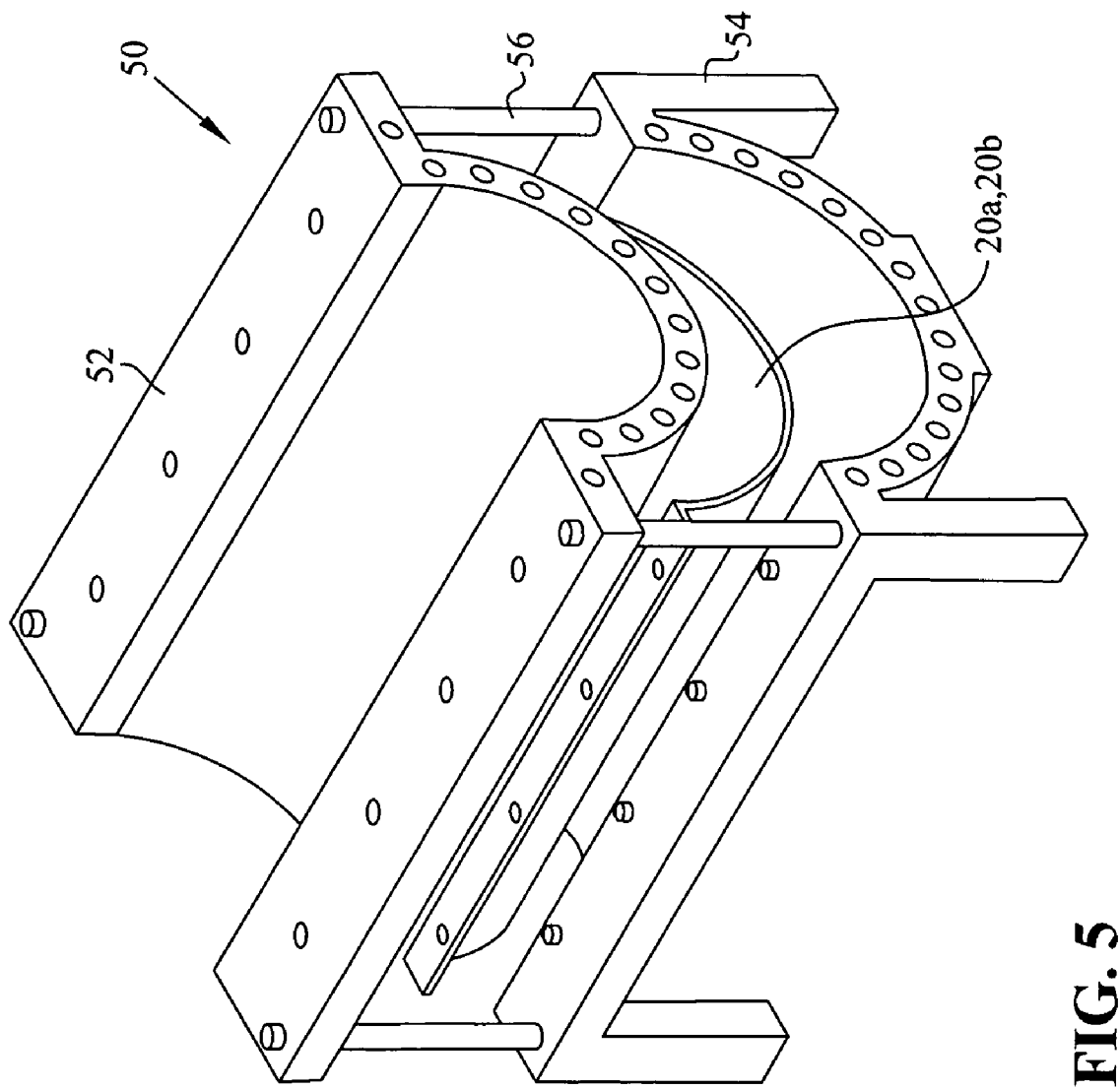
FIG. 5 is a perspective view of one-half of a composite molded sleeve and mold for making the sleeve for use in the repair assembly of FIG. 2.

Now referring to FIG. 5, a mold, generally indicated as 50, is shown which may be used to manufacture semicylindrical halves 20a and 20b. Mold 50 includes a male portion 52 and a female portion 54, which may be connected by rods or other connecting members 56 to provide relative movement between male portion 52 and female portion 54 as is known in the art.

Composite repair assembly 10 also includes one or more heating elements, which in this embodiment, are molded into semicylindrical halves 20a and 20b for providing heat to allow the thermoplastic material to flow and seal area 18 of pipe 12. The heating element may be manufactured from any suitable material capable for use in establishing a resistive current therein, such as nickel chromium. The heating elements may be provided in single strand wire form, a mesh or any suitable configuration for providing heat to the thermoplastic material. It should be appreciated that the heating element does not have to be embedded in the thermoplastic material, but such does provide for a convenience of installation on pipe 12. As discussed below, heating elements may also be provided externally to the layer of thermoplastic material, or alternately, heating bags, blankets, or tooling with integral heating, such as hot oil, may be used. Alternately, a torch or other heating source, such as infrared, may also be employed.

To use composite repair assembly 10, the area requiring repair must be located and excavated (if underground). The site requiring repair may be located by evidence of leaking, ultrasound, or other known testing techniques. Once excavated, it is preferable to clean the pipe to remove any dirt, oil/grease and loose scale or rust. Thereafter, the semicylindrical halves 20a and 20b of the thermoplastic layer of material 20 are placed about pipe 12 to surround the area to be repaired. As such, the thermoplastic material forms a sleeve about pipe 12. Overpress 30 is placed around the layer of thermoplastic material as shown in FIGS. 2-4, and reinforcement members 40a and 40b placed on the outside of flanges 32a and 32b so that holes 24, 34 and 44 are in alignment with one another.

Reinforcement members 40a, 40b; flanges 22a, 22b and 32a and 32b are then held together using fasteners 46 and nuts 48 with fasteners 46 inserted through holes 24, 34 and 44. Please note other fasteners or fastening methods may be used, such as, but not limited to, rivets, clamps, wire, ties, welding or adhesive.

Once assembled, the composite repair assembly may be heated. The heat will cause thermoplastic layer 20 to flow and seal area 18. It should be appreciated that overpress 30 keeps layer 20 close to pipe 12 to try to minimize any pockets of air or unsealed gaps around pipe 12.

Figure 6:
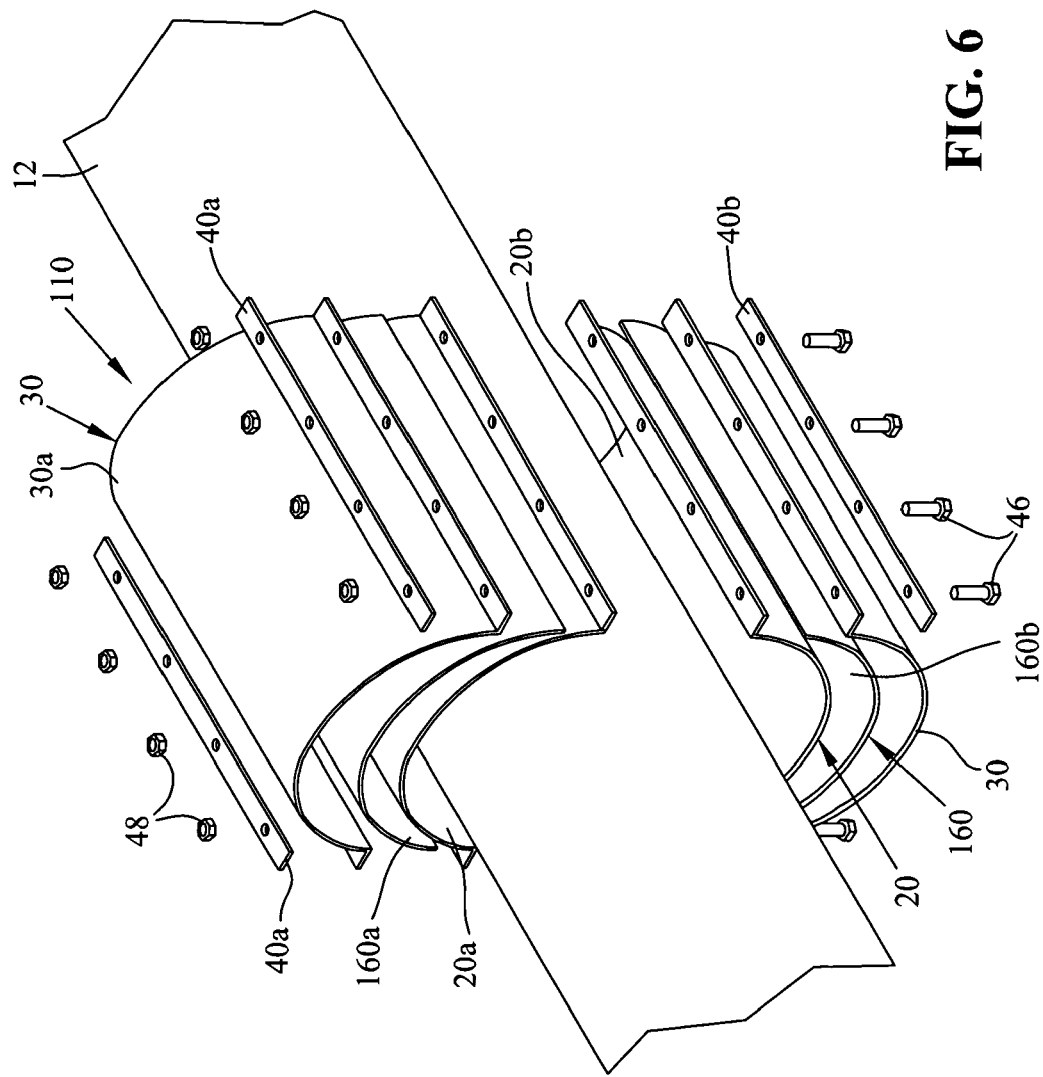
FIG. 6 is an exploded perspective view of an alternate embodiment repair assembly including a layer of material having a high coefficient of thermal expansion.
Figure 7A:
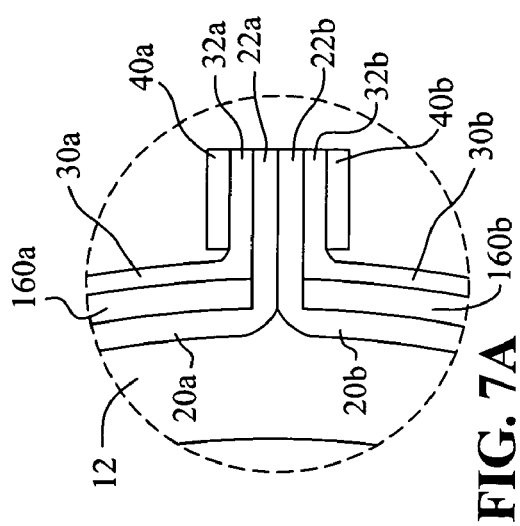
FIG. 7 is an end view of the repair assembly of FIG. 6.
Figure 7:
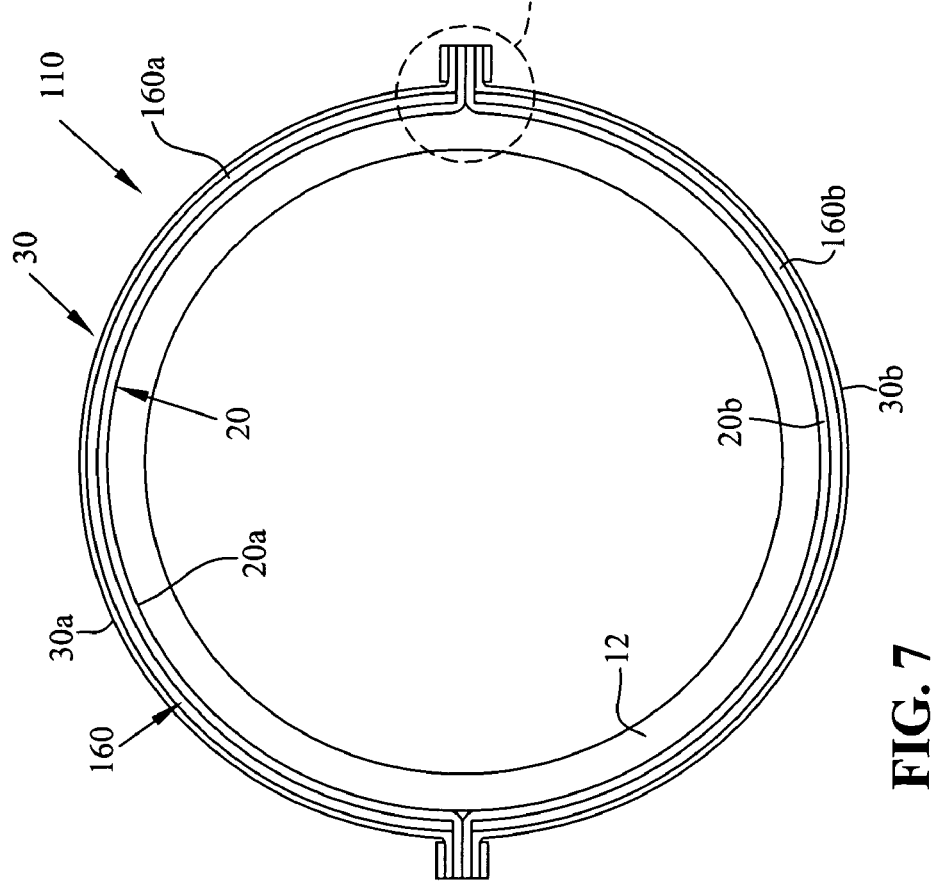

Referring now to FIGS. 6 and 7, an alternate embodiment composite repair assembly is shown generally as 110. Repair assembly 110 is configured to repair an area in pipe 12 and similar to composite repair assembly includes thermoplastic material layer 20 having semicylindrical halves 20a and 20b; overpress 30 having semicylindrical halves 30a, 30b; and reinforcement members 40a, 40b. In addition, composite repair assembly 110 also includes a layer of high Coefficient of Thermal Expansion (CTE) material, generally indicated as 160. In this embodiment, layer 160 of high CTE material has two semicylindrical portions 160a and 160b. It should be appreciated that layer of high CTE material 160 may be provided independently of layer 20 and overpress 30 or alternately, may be preattached to one or the other. Each half 160a, 160b may be attached to the respective semicylindrical half 20a, 20b or 30a, 30b using an adhesive, tape, hook and loop fasteners or other known ways of attachment. Layer 160 is preferably a rubberized or elastomeric material, including, but not limited to, rubber, Neoprene®, fluorocarbon, or fluorosilicon.

In installation and operation, the composite repair assembly 110 functions similarly to composite repair assembly 10; however, layer of high CTE material 160 provides additional compression on layer of thermoplastic material 20 to provide enhanced sealing. Since layer 160 has a high coefficient of thermal expansion, when the repair assembly is heated, layer 160 will tend to expand more than either layer of thermoplastic material 20 or overpress 30. Accordingly, as overpress 30 restricts outward expansion of layer 160, layer 160 will tend to expand inwardly thereby pushing thermoplastic layer 20 even tighter about pipe 12 when heated to provide a better seal around area 18. When the heat is removed, thermoplastic layer 20 will harden in the compressed state around pipe 12.

Figure 8:
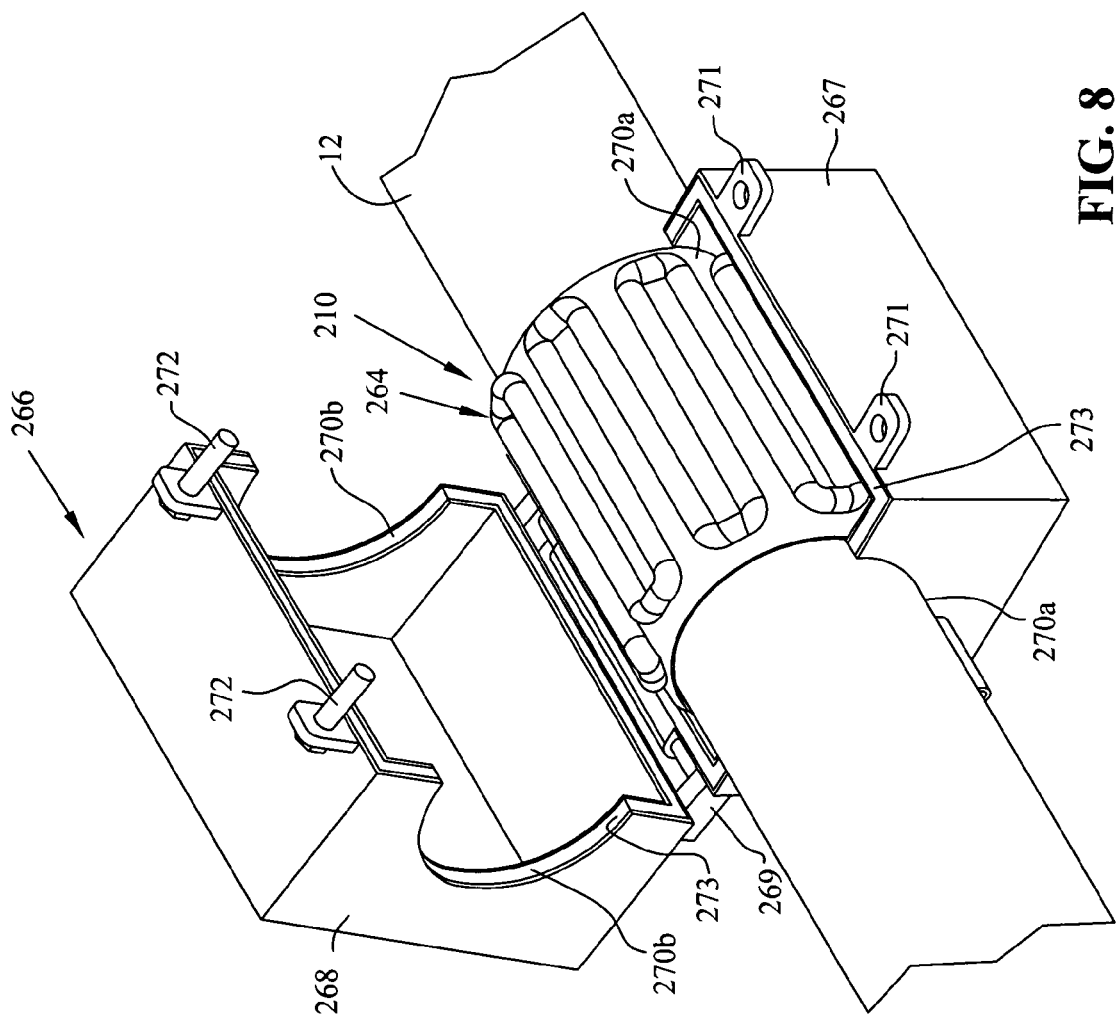
FIG. 8 is a perspective view of another embodiment of a repair assembly including an external heating assembly and heating container shown with the container in an open position.

Now referring to FIG. 8, an alternate composite repair assembly, generally indicated as 210, is shown and can include the components of either repair assembly 10 or repair assembly 110, and in addition, includes a heating element(s) or source, generally indicated as 264. Heating element 264 is provided in a sinusoidal configuration in the embodiment shown and may contain a fluid, such as hot oil, that provides and transfers heat to composite repair assembly 210. It should be appreciated that other configurations and types of heating elements may be used with the present assembly as discussed above. Composite repair assembly 210 also includes a hot box/thermo-insulating container, generally indicated as 266, for holding the heat in composite repair assembly 210 and pipe 12 until the repair is complete. In the embodiment shown, hot box 266 includes a bottom portion 267, a top portion 268 and a hinged connection 269 connecting bottom portion 267 and top portion 268. Bottom portion 267 and top portion 268 each include semicircular openings 270a and 270b, which form circular openings when hot box 266 is closed to allow pipe 12 and composite repair assembly 210 to be received in the hot box. Hot box 266 also includes mating latching or securing mechanisms 271 and 272, respectively, on bottom portion 267 and top portion 268. Latching mechanisms 271 and 272 may comprise pin and hasp mechanisms or other known securing and locking mechanisms. Also, both bottom portion 267 and top portion 268 of hot box 266 include a layer of insulating material 273 to hold heat in the composite repair assembly during the heating step. As is known and appreciated by one skilled in the art, heating element 264 is connected to a mechanism and source for providing heat to element 264, such as a resistive element, or combustive heat.

Once the repair is completed and the layer of thermoplastic material has sealed area 18 in pipe 12, heating element 264 and hot box 266 may be removed, or alternately, left in place in case the need arises to reheat the repair assembly, to further compress or better seal thermoplastic layer 20 about area 18.

Figure 9:
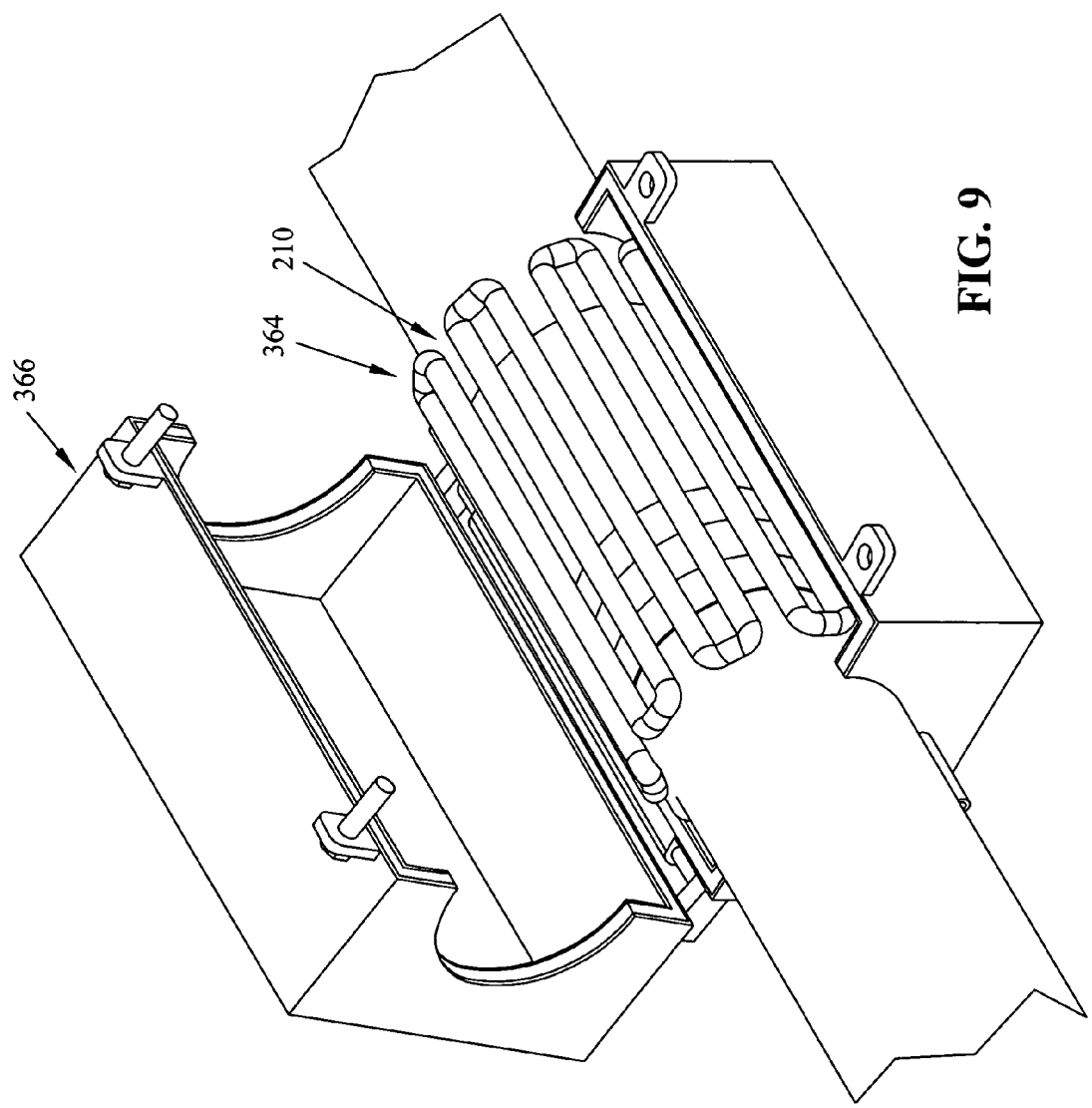
FIG. 9 is a perspective view showing an alternate embodiment external heater and heating container shown with the container in the open position.

Now referring to FIG. 9, an alternate embodiment heating mechanism, generally indicated as 364, is shown, along with an alternate embodiment hot box, generally indicated as 366. Heating element 364 and hot box 366 are similar in most respects to heating element 264 and hot box 266, respectively, except that heating element 364 is elongated so that it extends past the ends of the composite repair assembly 210. This is to ensure uniform heating throughout the entirety of composite repair assembly 210 and layer of thermoplastic material 20.

Figure 10:
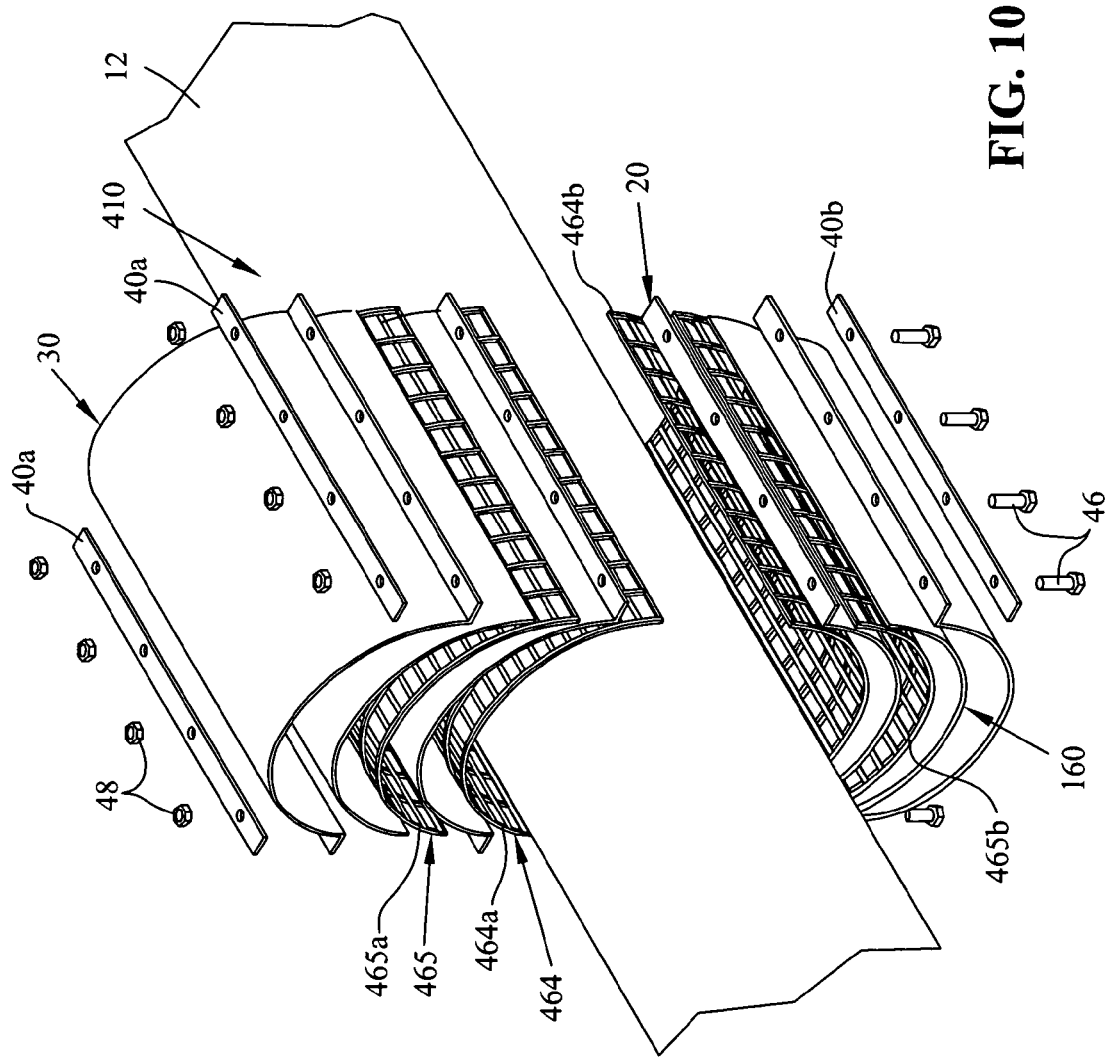
FIG. 10 is a perspective view of another embodiment of a repair assembly and heating assembly in accordance with the subject invention.

Now referring to FIG. 10, yet another alternate embodiment composite repair assembly is shown, generally indicated as 410. Composite repair assembly 410 is similar in most respects to composite repair assembly 110, with the exception that composite repair assembly 410 includes dual layers of heating elements, generally indicated as 464 and 465. In the embodiment shown, heating element 464 is provided in two semicylindrical halves 464a, 464b, and heating element 465 is also provided in two semicylindrical halves 465a, 465b. Heating elements 464 and 465 are further provided in a wire mesh configuration of resistive heating elements, which may be nickel chromium as discussed above. The heating elements 464 and 465 may be of an alternate configuration such as a single strand wire form, or any configuration suitable for providing heat to the thermoplastic material. As is well known and appreciated by one skilled in the art, heating elements 464 and 465 are connected to a source of electrical power (not shown) with wires or other electrical connectors (not shown).

Composite repair assembly 410 is assembled and used similar to other composite repair assemblies discussed above; however, heating element 464 is placed between layer of thermoplastic material 20 and pipe 12, and heating element 465 is placed between thermoplastic layer 20 and layer of high CTE material 160. Accordingly, heating element 464 may be used to preheat pipe 12. As will be appreciated by one skilled in the art, the in ground installation of pipe 12 may result in pipe 12 and area 18 being at a low temperature, especially in the winter months of cold climates. As such, in order for thermoplastic layer 20 to be heated and properly flow around pipe 12, it may be necessary to preheat the pipe. Accordingly, heating element 464 may be activated before activating heating element 465. The placement of heating element 465 allows it to provide heat to both thermoplastic layer 20 and layer 160 of high CTE material, thereby providing expansion of layer 160 and compression of layer 20 as discussed above. It should be appreciated that heating element 465 may be placed to the exterior of layer 160 or even to the exterior of overpress 30 as shown with heating elements 264 and 364 in FIGS. 8 and 9, respectively.

Figure 14:
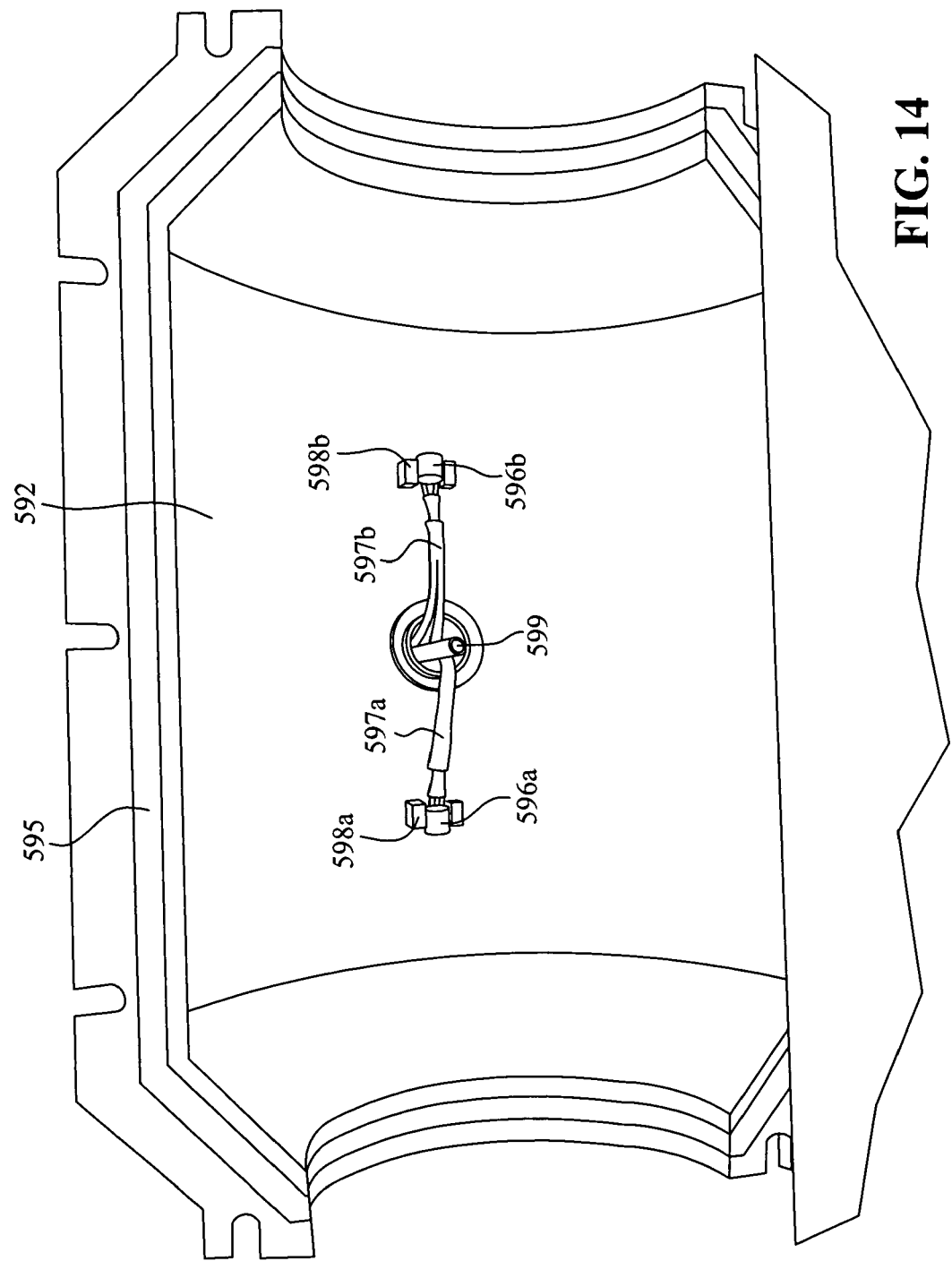
FIG. 14 is a plan view of the top portion of the sensor boot.

Now referring to FIGS. 11-14, the composite repair assemblies of the present invention may be provided with sensors to monitor and verify the integrity of the repair. In this embodiment, a pair of strain gauge sensors 580a and 580b is provided. Strain gauge sensor 580a is attached to pipe 12, while strain gauge sensor 580b is attached to thermoplastic layer 20. Electrical wires or connectors 582a-c are provided for electrical connection of the strain gauge sensors to a microprocessor or control device 584 (FIG. 1). Also as shown in FIG. 1, a conduit 586 is provided to route electrical wires 582a-c from strain gauge sensors 580a and 580b to microprocessor 584. Also, as shown in FIGS. 12-14, a sensor boot, generally indicated as 588, may be included to provide environmental protection to the repair assemblies, strain gauges, and to provide a secondary containment structure that houses sensors within the cavity for detection of leakage of the composite repair. In the embodiment shown, sensor boot 588 is provided in two halves, including a bottom portion 590, a top portion 592, and a hinge 593 connecting portions 590 and 592. Portions 590 and 592 may be provided with semicircular openings 594a, 594b, respectively, to form a circular opening to allow the sensor boot to encompass and receive pipe 12, when the boot is closed about the pipe. Sensor boot 588 may also include a seal member 595 to provide a seal between the top and bottom portions as well as with pipe 12.

In addition to strain gauge sensors 580a and 580b, additional sensors 596a and 596b, such as gas or pressure sensors, may also be included in sensor boot 588 or external thereto. In the embodiment shown, sensors 596a and 596b may be connected to microprocessor 584 through conduit 586 with electrical wires or connectors 597a and 597b. In addition, brackets 598a and 598b may also be provided in the sensor boot for mounting sensors 596a and 596b, respectively, thereto. It should be appreciated that brackets 598a and 598b may be formed as an integral portion of sensor boot 588 or may be attached thereto using known attachment mechanisms or fasteners. In the embodiment shown, sensor boot 588 is also provided with a gas tube 599 extending into the interior of the sensor boot through conduit 586 for reasons discussed below.

In operation, strain gauge sensors 580a and 580b can be used to monitor the integrity of the repair. If the strain in strain gauge sensor 580b attached to thermoplastic layer 20 significantly changes relative to the strain detected in strain gauge sensor 580a, which is attached to pipe 12, then this could be an indication that the integrity of the repair may be compromised. In other words, if thermoplastic layer 20 is expanding or relaxing at a rate greater than anticipated relative to pipe 12, then this may be an indication that either the composite repair has lost its seal or its structural reinforcement provided by thermoplastic layer 20 around area 18. Acceptable values of strain in sensor 580b can be programmed into microprocessor controller 584, and if the strain readings exceed allowed design constraints, the microprocessor can actuate an alarm to be sounded or send a signal warning about the failure or potential failure of the repair.

In addition, with the disclosed assembly, sensor boot 588 can be used to assist in detecting any substance leaking from or into the repair. For instance, sensors 596a and 596b may be natural gas sensors if pipe 12 is carrying natural gas to sense if any gas is leaking through the composite repair. Gas tube 599 is provided to introduce oxygen or other known gas atmosphere into the sensor boot so that the sensors can detect a change in the known atmosphere due to a leak. It should also be appreciated that the gas sensors may be located external to the boot, wherein the gas tube could be used to draw atmosphere from inside the boot to the sensors to determine if a leak has occurred. Placing the gas sensors in microprocessor 584 or otherwise located above ground would make the sensors more accessible for replacement in the event of a failure.

Figure 15:
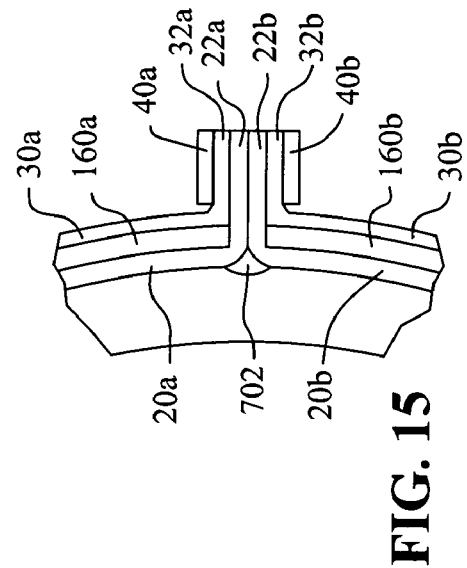
FIG. 15 is an end view of a portion of a composite repair assembly showing a sealing insert for use with the composite repair.

Referring now to FIG. 15, an optional sealing insert or sealing member 702 is provided. Sealing member 702 can be positioned along the inside diameter of the seam created by the joining of semicylindrical thermoplastic halves 20a and 20b and adjacent flanges 22a, 22b. As shown in FIG. 15, the seam area between semicylindrical halves 20a and 20b may result in a recess that could possibly lead to a leak path of the repair. Accordingly, sealing member 702 may be placed at this juncture to enhance the sealing. The cross-sectional configuration of sealing member 702 in the embodiment shown has a generally triangular top end configured to be received in the gap between halves 20a and 20b and a rounded or flat head; however, it should be appreciated that any suitable configuration may be employed. Sealing member 702 may be manufactured from a similar material as thermoplastic layer 20 or may also be manufactured from high CTE material as is used to make layer 160. One skilled in the art will recognize that other materials may also be used to provide sealing member 702.

Figure 16:
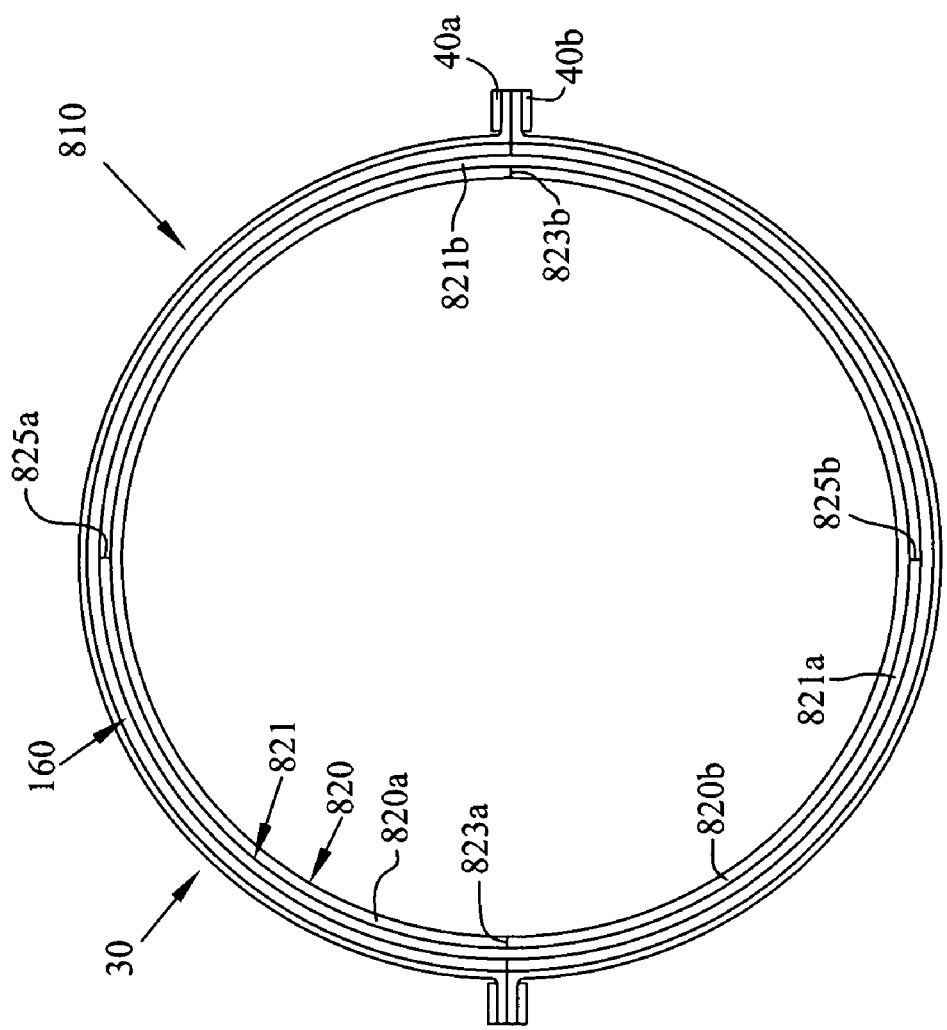
FIG. 16 is an end view of an alternate embodiment composite repair assembly including two layers of thermoplastic composite repair material, with the pipe removed for clarity.

Now referring to FIG. 16, yet another alternate embodiment composite repair assembly is generally indicated as 810. Composite repair assembly 810 is somewhat similar to composite repair assembly 110; however, repair assembly 810 includes two layers of thermoplastic material, generally indicated as 820 and 821. Both layers 820 and 821 are provided in two semicylindrical halves 820a, 820b and 821a and 821b, respectively. Unlike layer 20, however, thermoplastic layers 820 and 821 do not include outwardly extending flanges, but do have longitudinally extending seams 823a, 823b between halves 820a and 820b, and longitudinally extending seams 825a, 825b between halves 821a and 821b. As is evident in FIG. 16, seams 825a and 825b are rotationally offset approximately 90° from seams 823a and 823b.

As should be appreciated, the dual layer of thermoplastic material can be used to provide enhanced resistance to deformation from any pressure or release through area 18 in pipe 12. Additionally, seams 823a, 823b and 825a, 825b are rotationally offset from one another to prevent having a localized area with a continuous leak path and to increase the resistance to deformation as compared to the seams being aligned with one another. It is preferable that the seams be offset at least 45° from one another. In addition, it should be readily apparent to one skilled in the art, that additional layers of thermoplastic material may also be used with this embodiment and it is recommended that the seams of any additional layers also be rotationally offset from seams 823a, 823b and 825a, 825b.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. For example, other mechanisms may be used to provide a compressive pressure to the thermoplastic layer(s) to enhance sealing in addition to or instead of the layer of high CTE material. For instance, a vacuum or pressure box could be used. As such, the scope of the invention is indicated by the following claims rather than by the description.

The invention claimed is:

1. A repair assembly for repairing a pipe comprising:
a layer of thermoplastic material in a sleeve configuration provided in two semicylindrical halves with longitudinal seams where said semicylindrical halves meet extending generally parallel to a longitudinal axis of the pipe, and further including outwardly extending flanges along said edges of said semicylindrical halves at said seams substantially surrounding the pipe in an area needing repair;
a heating element located to provide heat to said layer of thermoplastic material; and
an overpress at least partially surrounding the pipe and said layer of thermoplastic material.

2. The repair assembly as set forth in claim 1, further including a sealing member extending parallel to the longitudinal axis of the pipe and located along said seams of the thermoplastic material.

3. The repair assembly as set forth in claim 2, wherein said overpress is configured into semicylindrical halves, and each half includes outwardly extending flanges along side edges thereof.

4. The repair assembly as set forth in claim 3, including a plurality of reinforcement members extending generally parallel to the axis of the pipe.

5. The repair assembly as set forth in claim 4, wherein when the repair assembly is assembled around the pipe and a sandwich configuration is formed along said flanges of said thermoplastic material and overpress, and wherein inner layers of the sandwich structure include opposing flanges of the thermoplastic material, middle layers of the sandwich structure include opposing flanges of the overpress, and outside layers are formed by said reinforcing members.

6. A repair assembly for repairing a pipe comprising:
a layer of thermoplastic material substantially surrounding the pipe in an area needing repair;
a heating element embedded in said layer of thermoplastic material, located to provide heat to said layer of thermoplastic material; and
an overpress at least partially surrounding the pipe and said layer of thermoplastic material.

7. A repair assembly for repairing a pipe comprising:
a layer of thermoplastic material substantially surrounding the pipe in an area needing repair;
a heating element located between the pipe and said layer of thermoplastic material to provide heat to said layer of thermoplastic material; and
an overpress at least partially surrounding the pipe and said layer of thermoplastic material.

8. The repair assembly as set forth in claim 1, wherein said layer of thermoplastic material is located between said heating element and the pipe.

9. A repair assembly for repairing a pipe comprising:
a layer of thermoplastic material substantially surrounding the pipe in an area needing repair;
a heating element located to provide heat to said layer of thermoplastic material;
an overpress at least partially surrounding the pipe and said layer of thermoplastic material; and
a layer of material having a significantly higher coefficient of thermal expansion than said thermoplastic material or said overpress, and located between said layer of thermoplastic material and said overpress.

10. A repair assembly for repairing a pipe comprising:
a layer of thermoplastic material substantially surrounding the pipe in an area needing repair;
a heating element located to provide heat to said layer of thermoplastic material;
an overpress at least partially surrounding the pipe and said layer of thermoplastic material; and
a second layer of thermoplastic thermoplastic material substantially surrounding the pipe in the area needing repair, both layers of thermoplastic material being provided in semicylindrical halves with longitudinally extending seams where the halves abut, and the longitudinally extending seams of said second layer are rotationally offset from said seams of said first layer.

11. The repair assembly as set forth in claim 10, wherein said seams of said second layer are rotationally offset at least 45° from said seams of said first layer.

12. A repair assembly for repairing a pipe comprising:
   a layer of thermoplastic material extending substantially around the pipe in an area needing repair;
   a heating element;
   an overpress at least partially surrounding the pipe; and
   a pair or more of optional strain gauges, at least one strain gauge located in contact with the pipe and at least one strain gauge located in contact with said layer of thermoplastic material.

13. The repair assembly as set forth in claim 12, further including a microprocessor electrically connected to said strain gauges to compare the relative strain in order to evaluate the integrity of the repair.

14. The repair assembly as set forth in claim 13, further including a sensor boot, providing an environmental seal about said repair and said strain gauges, said boot providing a sealed secondary containment structure having leak detection sensors located within the resulting cavity to detect the presence of substances that may have leaked across the composite repair.

15. The repair assembly as set forth in claim 13, wherein said sensor boot includes a hinged opening.

16. The repair assembly as set forth in claim 13, further including an electrical conduit extending from said sensor boot to said microprocessor.

17. The repair assembly as set forth in claim 13, wherein said microprocessor is located above the surface of the ground and the pipe is located underground.

18. The repair assembly as set forth in claim 12, further including a layer of material having significantly higher coefficient of thermal expansion than said thermoplastic material or said overpress, and said layer of material having a higher coefficient of thermal expansion being located between said overpress and said layer of thermoplastic material.

19. The repair assembly as set forth in claim 12, wherein said thermoplastic material includes longitudinally extending seams extending generally parallel to an axis of the pipe, and further including a sealing member extending along said seams on an inside surface of said thermoplastic material.

20. The repair assembly as set forth in claim 12, including a second layer of thermoplastic material substantially surrounding the pipe in the area needing repair, both layers of thermoplastic material being provided in semicylindrical halves with longitudinally extending seams where the halves abut, and the longitudinally extending seams of said second layer are rotationally offset from said seams of said first layer.

21. A method for repairing a pipe, wherein the pipe may be installed in a field application, the method comprising the steps of:
   identifying an area in the pipe requiring repair and providing access around said area;
   providing a repair assembly including a layer of thermoplastic material substantially surrounding the pipe in the area needing repair, a heating element, and an overpress at least partially surrounding the pipe and said layer of thermoplastic material;
   installing the repair assembly around the area in the pipe requiring repair;
   activating said heating element to cause said thermoplastic material to flow around and seal the area in the pipe, the thermoplastic material being outwardly restrained by said overpress;
   providing a layer of material having a significantly higher coefficient of thermal expansion than said layer of thermoplastic material or said overpress; and
   providing the layer of material having a higher coefficient of thermal expansion between said overpass and said layer of thermoplastic material.

22. A method for repairing a pipe, wherein the pipe may be installed in a field application, the method comprising the steps of:
   identifying an area in the pipe requiring repair and providing access around said area;
   providing a repair assembly including a layer of thermoplastic material provided in two semicylindrical halves and each half includes outwardly extending flanges extending along longitudinally extending side edges thereof and substantially surrounding the pipe in the area needing repair, a heating element, and an overpress at least partially surrounding the pipe and said layer of thermoplastic material;
   installing the repair assembly around the area in the pipe requiring repair; and
   activating said heating element to cause said thermoplastic material to flow around and seal the area in the pipe, the thermoplastic material being outwardly restrained by said overpress.

23. The method for repairing a pipe as set forth in claim 22, wherein said overpress is also provided in two semicylindrical halves, and each half includes outwardly extending flanges along longitudinally extending side edges.

24. The method for repairing a pipe as set forth in claim 22, further including the steps of providing reinforcement members and fasteners and fastening said reinforcement members together with said flanges of said thermoplastic material and said overpress using said fasteners.

25. The method for repairing a pipe as set forth in claim 21, including the step of providing a second layer of thermoplastic material substantially surrounding said first layer, each of said layers being provided in substantially a semicylindrical configuration having longitudinally extending seams along the edges of each semicylindrical section, and rotationally offsetting said seams of said second layer at least 45° from said seams of said first layer.

26. A method for repairing a pipe, wherein the pipe may be installed in a field application, the method comprising the steps of:
   identifying an area in the pipe requiring repair and providing access around said area;
   providing a repair assembly including a layer of thermoplastic material substantially surrounding the pipe in the area needing repair, a heating element, and an overpress at least partially surrounding the pipe and said layer of thermoplastic material;
   installing the repair assembly around the area in the pipe requiring repair;
   activating said heating element to cause said thermoplastic material to flow around and seal the area in the pipe, the thermoplastic material being outwardly restrained by said overpress;
   providing at least two strain gauges;
   attaching at least one of the strain gauges in contact with the pipe;
   attaching at least one strain gauge in contact with the thermoplastic material; and
   monitoring the strain in the two gauges to evaluate the integrity of the repair.

* * * * *